May 25, 1965 H. WEZEL 3,184,785
ROTARY CUTTER
Filed April 24, 1962
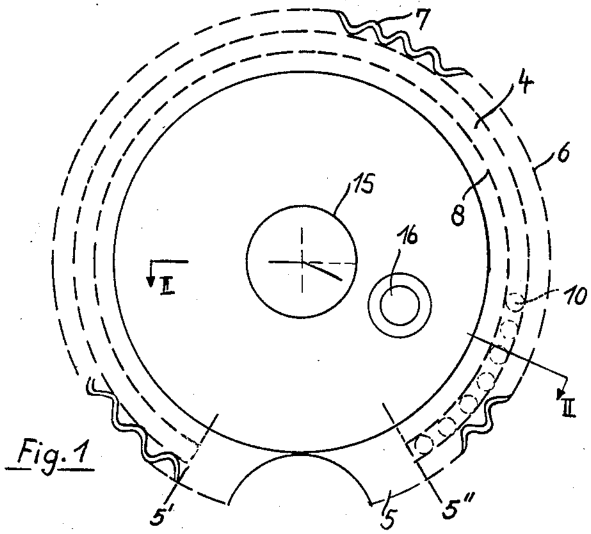
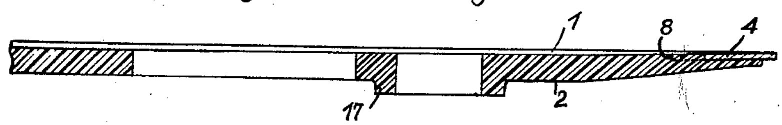
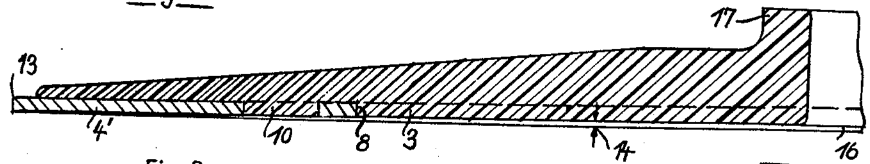
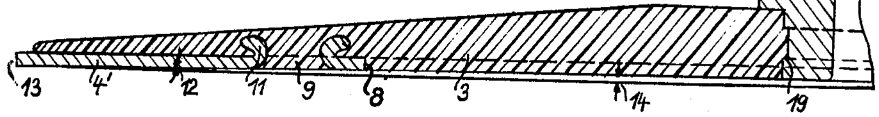
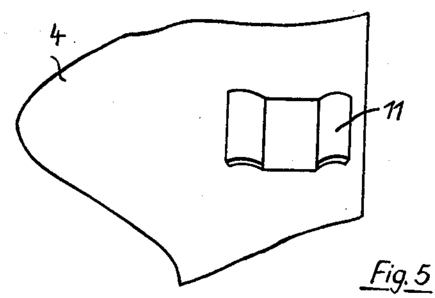
Fig. 5
INVENTOR
HANSGEORG WEZEL
BY Mestern, Ross and Mestern United States Patent Office 3,184,785 Patented May 25, 1965

3,184,785
ROTARY CUTTER

Hansgeorg Wezel, Maulbronn, Wurttemberg, Germany, assignor to Schmid & Wezel, Maulbronn, Wurttemberg, Germany, a firm.
Filed Apr. 24, 1962, Ser. No. 189,899
Claims priority, application Germany, May 4, 1961, Sch 29,660
3 Claims. (Cl. 17—21)

This invention relates to angularly displaceable cutters of the kind which are substantially circular and are provided with cutting teeth at the periphery and are suitable in particular, although not exclusively, for use in flaying or disintegument devices. Such rotary cutters are sometimes called parting discs or blade discs.

In a flaying apparatus, generally two such rotary cutters are provided which are mounted on a common shaft and are set in oppositely directed high-frequency oscillation by drive levers. The two rotary cutters are juxtaposed with one another along their inner surfaces, so that the cutting teeth slide on one another on the periphery of the blade discs and constantly sharpen themselves. The mechanically driven devices are used especially for the flaying or skinning of large carcasses such as those of calves, horses, etc. The outer or forward ends of the teeth, which in known rotary cutters have the same size and shape everywhere, are blunt so that they cannot cut into the valuable hide. They penetrate by impact into the connective membrane between hide and flesh, which is cut through by the rear knife-sharp lateral facettes or edges of the teeth. The cutting teeth sliding against one another act upon reciprocating movement of the concentrically mounted cutters like individual shears.

The known rotary cutters are produced from steel with high chrominum alloy content. They, therefore, are very expensive and furthermore can be reground only a few times after wear. It is an object of the present invention to provide an improved blade disk of this general character.

The instant invention provides that the cutting teeth consist of thin, stamped-out sheet steel, for example of razor-blade steel, and that this steel sheet be connected with a support of synthetic plastic material. Rotary cutters produced in this manner require only a fraction of the former production expense and are so inexpensive that, after they have become blunt, they can simply be replaced by new rotary cutters.

The production of such blades can be reduced to two working operations. In a first step the steel sheet is stamped out completely and in the next operation the steel sheet is inserted into a mold and connected firmly with the synthetic plastic part in the course of shaping the latter.

The steel sheet can advantageously form a ring, the outer periphery of which is defined by the blunt tips of the stamped-out teeth. The sheet steel ring can be cut open and its width made such that beside the teeth, there remains a sufficient annular margin between the roots of the teeth and the inner periphery for the reception of means for the firm connection with the synthetic plastic support. These means can consist of stamped-out lateral formations in the vicinity of its internal periphery, which in one embodiment are bordered expediently by slot-like incisions. These formations can be separated from one another in the middle and curved over in hook form. In the connection of the synthetic plastic support to the steel sheet, the synthetic plastic mass grips beneath the hooks and ensures firm cohesion of the two parts. In another embodiment the stamped-out portions can consist of circular openings; thus the steel sheet can simply be perforated. In the production, the synthetic plastic mass flows into these openings and when hardened forms small lateral pegs which transmit the torque from the drive shaft to the toothed sheet steel ring, without stress upon the adherent connection between the synthetic plastic part and the sheet metal part.

The annular steel sheet can, advantageously, be of frusto-conical configuration as seated in the synthetic plastic support, so that the plane passing through the tooth tips is axially spaced outwardly from the inner support surface. In theory, only the tooth tips of the opposed rotary cutters are in contact, but springs are provided which press the rotary cutters lightly against one another, so that the resilient sheet steel rings bend. Thus the entire cutting area of the knife-sharp lateral facettes of the teeth comes into engagement, the teeth hone on one another during running, thereby sharpening one another and remaining capable of cutting for a very long time. The frustoconical inner side of the rotary cutter can also be made rounded and may be outwardly concave. In dependence upon the angle of conicity tensions may be produced in the sheet steel ring during production. It is therefore possible for the ring to be assembled from individual sectors to avoid such stresses.

The synthetic plastic support can be pressed onto the steel sheet or, for example, produced separately and subsequently joined to the steel sheet. In both cases the connection is made so elastic that detachment from one another due to the bending movement in the pressing of the two rotary cutters against one another is avoided.

The two cutters arranged in a flaying apparatus are, according to earlier techniques, mounted in a concentric recess on one shaft and provided with a bore for the engagement of a respective drive lever. According to the invention the recess and the bore can be arranged in the synthetic plastic support and constructed as a bearing. The selection of an appropriate synthetic plastic material should take into consideration the fact that the strength must be sufficiently great to take up the occurring stresses. The bearing points can thus be reinforced or a steel hub can be pressed into the bore for the engagement of the drive lever in the synthetic plastic support, for example, simultaneously with the pressing of the synthetic plastic support onto the sheet-steel ring.

The invention is illustrated by way of example with reference to two embodiments in the accompany drawing, wherein:

FIGURE 1 shows a plan view of the outer side of a disk-type cutter,

FIGURE 2 shows a partial section through the cutter on an enlarged scale, taken along the line II—II in FIGURE 1, FIGURE 3 shows a detail of FIGURE 2 on an enlarged scale, rotated by 180° relatively to the position shown in FIG. 2, FIGURE 4 shows a similar detail in the case of another form of embodiment and FIGURE 5 shows a top plan view of a part of the steel ring according to FIGURE 4 prior to deposition of plastic thereon.

In the drawing, reference numeral 1 designates the inner exterior surface and 2 the outer exterior surface of the cutter, which is assembled from a synthetic resin support member 3 and an annular steel member 4 which constitutes the blade. Such a member can be made in one piece or assembled from sectors, and is provided on its outer periphery 6 with teeth 7, which are stamped out in the production of the sheet steel ring. The outer periphery thus is toothed in undulatory form. In the vicinity of the inner periphery 8 of the steel member 4 there are provided stamped-out portions which constitute, for example, incisions 9 or circular openings 10. The incisions 9 are separated from one another in the middle and the individual tabs or lugs 11 are bent over in hook form (FIG. 4). Production of the cutter first requires that the sheet-steel rings are inserted into a synthetic resin pressure mold; the synthetic resin support 3 is then formed on the ring while, at the same time, a firm-connection with the sheet steel ring is constituted. The resin mass here fills the openings 10 or incisions 9 of the sheet steel ring and grips behind the hook-shaped tabs 11. The steel member 4 (4' in FIGS. 4 and 5) is inserted at an angle 12 into the pressure mold, that is to say it forms a part of the surface of a cone and, since it is concave inwardly from the surface 1, a distance 14 thus exists between the surface 1 and an imaginary plane intersecting the teeth 7 parallel to and axially spaced from the support member 3. Since the synthetic plastic support 3 is also tapered towards the outer periphery 6 of steel member 4, a relatively highly elastic, dish-shaped body is produced, so that the two cutters, pressed against one another by springs, slide on one another in the region of the teeth 7 in the sheet steel rings.

In the synthetic plastic support 3 there is situated a concentric recess 15 for mounting on a shaft. The bore 16, by means of which the cutter is oscillated, can be reinforced by a collar 17, however it is also possible for a hub 18, for example of steel, to be inserted, which can be placed in the mold in the production of the rotary cutter and thus pressed into the synthetic plastic part. A groove 19 is machined into the hub 18 for the firm connection with the support 3.

I claim:

1. A blade disk for disintegument devices and the like, comprising a generally flat circular support member of synthetic resin material, and an arcuate steel blade member overlying only an outer marginal portion of said support member along an exterior surface thereof, said blade member being concave away from said exterior surface and formed with a peripheral array of substantially radially extending teeth wholly outwardly of the periphery of said support member, the tips of said teeth terminating in a common plane parallel to and axially spaced from said surface and with a plurality of angularly spaced throughgoing lateral openings, said support member being integrally provided with a plurality of laterally extending formations projecting into said openings and completely filling them, and said blade member being further provided with laterally extending integral lugs imbedded in said support member for positively securing both of said members together.

2. A blade disk for disintegument devices and the like, comprising a generally flat circular support member of synthetic resin material, and an arcuate steel blade member overlying only an outer marginal portion of said support member along an exterior surface thereof, said blade member being formed with a peripheral array of substantially radially extending teeth wholly outwardly of the periphery of said support member and with a plurality of angularly spaced throughgoing lateral openings, said support member being integrally provided with a plurality of laterally extending formations projecting into said openings and completely filling them and said blade member being further provided with laterally extending integral lugs imbedded in said support member for positively securing both of said members together.

3. A blade disk for disintegument devices and the like, comprising a generally flat circular support member of synthetic resin material, and an arcuate steel blade member overlying only an outer marginal portion of said support member along an exterior surface thereof, said blade member being formed with a peripheral array of substantially radially extending teeth wholly outwardly of the periphery of said support member and with a plurality of angularly spaced throughgoing lateral openings, said support member being integrally provided with a plurality of laterally extending formations projecting into said openings and completely filling them and said blade member being further provided with laterally projecting integral lugs flanking said openings and imbedded in said support member for positively securing said members together.

References Cited by the Examiner

UNITED STATES PATENTS

| | | | |
|---|---|---|---|
| 1,932,563 | 10/33 | Thewes | 30—347 |
| 2,836,889 | 6/58 | Joyet et al. | 30—347 X |

FOREIGN PATENTS

| | | |
|---|---|---|
| 1,059,316 | 11/53 | France. |
| 445,911 | 4/36 | Great Britain. |

SAMUEL KOREN, *Primary Examiner.*

EDWARD V. BENHAM, LUCIE H. LAUDENSLAGER, *Examiners.*